Feb. 15, 1938.     H. J. EDWARDS     2,108,110
AUTOMATIC SWITCH FOR USE IN TELEPHONE OR LIKE SYSTEMS
Filed Dec. 2, 1935
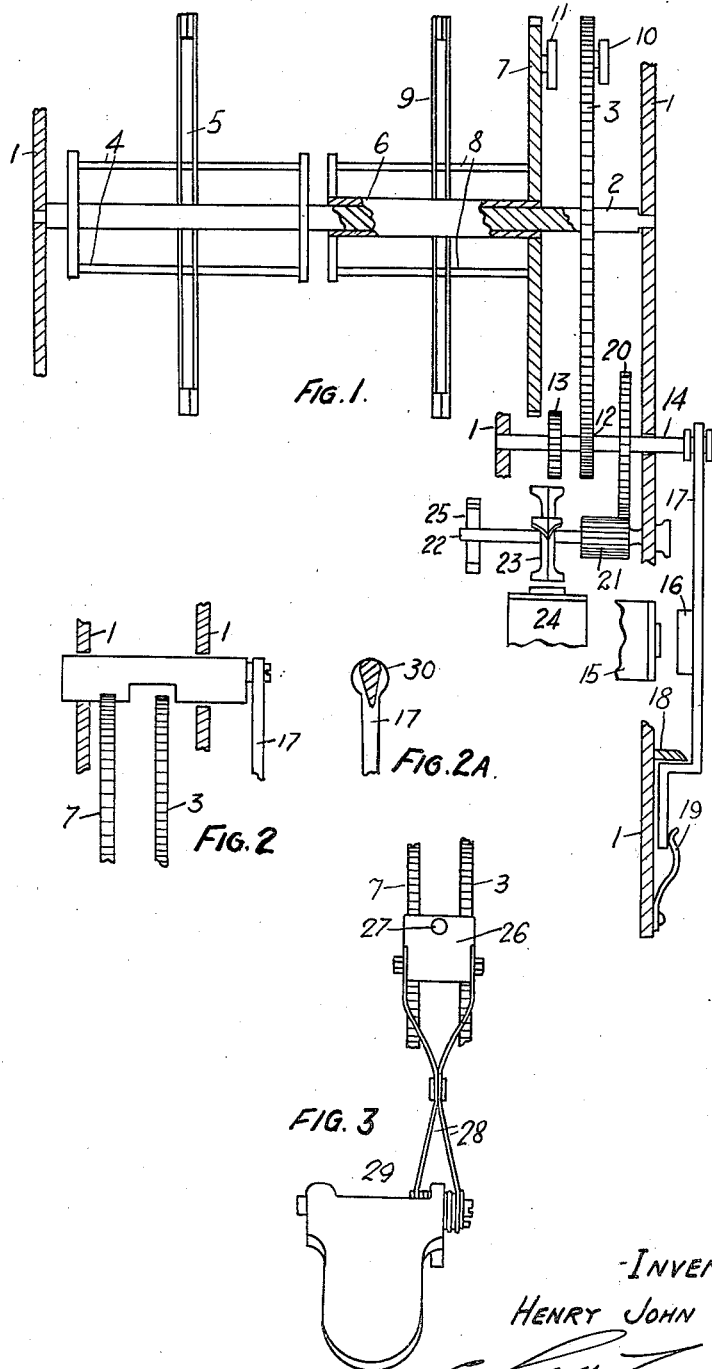
INVENTOR-
HENRY JOHN EDWARDS
ATTY.

Patented Feb. 15, 1938

2,108,110

UNITED STATES PATENT OFFICE 2,108,110

AUTOMATIC SWITCH FOR USE IN TELEPHONE OR LIKE SYSTEMS

Henry John Edwards, Dartford, England, assignor to Siemens Brothers & Company Limited, London, England Application December 2, 1935, Serial No. 52,548
In Great Britain December 20, 1934

6 Claims. (Cl. 179—24)

The present invention relates to electromagnetic switches of the type used in telephone or like systems and is particularly applicable to an interconnecting arrangement such as disclosed in United States Patent No. 1,903,211, granted March 28, 1933, to D. A. Christian. In this case a selecting switch is disclosed which is arranged to provide for the connection of any one of a comparatively large number of inlets to any one of a comparatively large number of outlets by means of a pair of wiper sets with a common driving means. The switch provides for the connection of any contact in one contact bank to any contact in the other contact bank.

In the present invention a plurality of sets of wipers and associated bank contacts are employed, the several wiper sets being driven by a common driving mechanism, the connection of the driving mechanism with a wiper set being through gearing, a common wheel on a driving shaft being adapted to be engaged with a toothed wheel on any one of the wiper driving shafts. In this case the various wiper sets do not rotate together.

The invention lends itself readily for use with a rotary switch driven by an individual electromotor, the motor and the movement of the switch being under the control of an electromagnetically-operated latch device, it being preferably arranged that a single latch mechanism is provided for operating on the several toothed wheels on the wiper driving shafts, and a further lock may be furnished adapted to engage and prevent from turning the toothed wheel of a wiper set not being driven by the motor.

The several sets of wipers are mounted on separate shafts which may be arranged concentrically, each shaft having a toothed wheel adapted to be engaged by a pinion of the gearing, and provision may be made to slide the spindle carrying the pinions for the engagement of one of the toothed wheels.

The spindle carrying the pinions may conveniently be moved by means of an electromagnet acting on the spindle through an arm attached to the magnet armature, the arm at the same time controlling the lock for the toothed wheels. Suitable circuit operations would provide for the operation of the electromagnet at the right time.

If the inlets and outlets are divided into two groups and four sets of wipers are provided, with suitable gearing and controlling arrangements connection may be made between an inlet and an outlet in one set and between differently disposed inlets and outlets of another set, and one of these connections may be made by the switch while a connection over the other set is still in being. The control arrangements would provide for guarding the switch from seizure for a connection during the setting up period of an earlier connection and for locking the appropriate wipers against rotation during a setting operation.

The invention is illustrated by way of example diagrammatically in the accompanying drawing as applied to a switch having two sets of wipers which are adapted to be driven independently from a single electromotor. Fig. 1 of the drawing illustrates a general arrangement of the apparatus, Fig. 2 is a view looking downward from the top of Fig. 1 and showing the manner in which one wiper set is held stationary during the time that the other wiper set is being moved, Fig. 2A a detail view of Fig. 2, and Fig. 3 the common latching mechanism for the wiper sets. Only those parts of the switch necessary for the understanding of the invention are shown, details such as the banks which are well known per se being omitted.

In the drawing the supporting frame is indicated at 1. The shaft 2 supported by the frame 1 has secured to it a driven cogwheel 3 and a framework 4, somewhat in the form of a squirrel cage, for supporting a wiper set 5. To a cannon 6 rotatable about the shaft 2 is secured a cogwheel 7, and the cannon and wheel support a further framework 8 carrying the wiper set 9. Each of the cogwheels 3 and 7 has fixed thereto a projection, 10 and 11 respectively, for operating off normal spring sets (not shown). The wheels 3 and 7 are adapted to mesh with pinions 12 and 13 respectively keyed to a spindle 14 supported by the frame 1. The pinion 12 is normally in mesh with the wheel 3, whereas the wheel 13 is out of mesh with the wheel 7, the shaft 14 being allowed longitudinal movement whereby the pinion 12 is disengaged from the wheel and the pinion 13 meshed with the wheel 7. Such longitudinal movement is imparted to the spindle 14 by means of an electromagnet 15 operating on an armature 16 attached to an arm 17 pivoting about a knife-edge projecting from the frame 1, a bifurcated end of the arm engaging the spindle 14 between stops thereon. A restoring spring 19 operates on the end of the arm 17 so as to maintain the armature away from the pole piece of the electromagnet, and the pinion 12 in engagement with the wheel 3.

To the spindle 14 is also secured a toothed wheel 20 which constantly meshes with a pinion 21 on a further spindle 22 supported in the frame 1, the spindle 22 also carrying the motor rotor 23 operated upon by energizing coils, only one of which is illustrated at 24, the coils being adapted to be energized in succession at each quarter of a revolution of the armature 23 by means of an interrupter spring set (not shown) operated on by the cam 25 attached to the spindle 22.

The arm 17 has an extension (shown in Fig. 2) which may extend downward from the part of armature 17 shown in Fig. 1 and which carries a locking member 30 (Fig. 2) slidable in the frame 1 below the wheels 3 and 7, the locking member normally, i. e. with the electromagnet 15 in a de-energized condition, engaging the cogwheel 7, the energization of the magnet 15 causing the locking member to be disengaged from the wheel 7 and engaged with the wheel 3.

The two cogwheels 3 and 7 (Fig. 3) are normally held stationary by means of a common latching member 26 (Fig. 3) having a contact point 27 thereon, the member 26 being supported by resilient arms attached to an electromagnetically-operated armature 29. The arms 28 are resilient in their longitudinal direction to absorb the energy of the wiper systems on the stopping thereof.

The operations are as follows: the components normally occupy the positions illustrated with the motor rotor 23 coupled to the cogwheel 3 via the wheels 21, 20, and 12. When the wiper set 5 is to be set to an outlet, the electromagnet controlling the armature 29 is energized and the latching member 26 lifted out of engagement with the cogwheels 3 and 7. The wheel 3 is thus released for rotation whereas the wheel 7 is held by the locking member 30.

On the lifting of the latching member 26 the contact 27 thereon closes the circuits for the motor magnet 24, in a manner not shown but known per se, and the armature 23 commences to rotate, driving the wiper set 5 over the associated bank contacts until a desired outlet is found whereupon the armature 29 is released to allow the latching member to re-engage the wheels 3 and 7 stopping the rotation of the former and to open the circuit of the motor. The wiper set 5 is thus set to a desired position.

For setting the wiper set 9 the magnet 15 is energized before or substantially at the same time as the magnet controlling the armature 29 and on the energization of the magnet 15 the arm 17 is caused to disengage the pinion 12 from the wheel 3 and to engage the pinion 13 with the wheel 7. The locking member 30 moves to the left to lock the wheel 3 and release the wheel 7. The wiper set 9 is then set to a required position via the wheels 21, 20, 13, and 7, and the cannon 6 whereupon the armature 29 is released and the magnet 15 de-energized so that the latching member re-engages the wheels 3 and 7, and the locking member re-engages the wheel 7 under the tension of spring 19.

The wiper sets are brought to their normal positions in a similar manner.

It will be appreciated that although the example illustrates a motor driven switch the power for driving the wipers may be derived from any motive source such as from a step by step mechanism or a continuously rotating source.

By connecting together electrically the two wiper sets any contact in one bank may be connected to any contact in the other bank.

I claim:—

1. A selecting switch having a plurality of wiper sets, a common driving means, gearing normally coupling said means to one wiper set and tending to drive that set, a latch normally holding the wiper sets against movement, electromagnetic means for operating the latch to permit movement of the one wiper set and means for shifting said gearing to couple the driving means with the other wiper set and prevent movement of said one wiper set.

2. A selecting switch having a plurality of wiper sets each having a gear wheel associated therewith, a motor driven gear, an intermediate shaft carrying a gear meshed with said motor driven gear and gears for engagement with said gear wheels, and means for moving said shaft endwise to mesh one of the gears thereon with one of the gear wheels to drive one wiper set individually.

3. In a selecting switch, a first gear and shaft therefor, an intermediate shaft, means for driving said first gear and shaft, a gear on said intermediate shaft normally engaging said first gear, two other gears on said intermediate shaft, a plurality of sets of wipers and a like number of mounting shafts therefor adapted to be selectively engaged to rotate said wiper sets to engage successive bank contacts, driving gears for each of said mounting shafts, normally connected means including one of said two other gears on said intermediate shaft and one of said driving gears for rotating one of said plurality of wiper shafts when said driving means is actuated, and electrically controlled means for sliding said intermediate shaft endwise to disengage said normally engaged driving gear on said one wiper shaft and to engage the other of said driving gears to rotate the other of said wiper shafts when said driving means is actuated.

4. In a selecting switch, a first gear and drive shaft therefor, an intermediate shaft, a motor for driving said first gear and shaft, a gear mounted on said intermediate shaft normally engaging said first gear, two other gears mounted on said intermediate shaft, a plurality of wipers adapted to be selectively engaged to rotate said wipers to engage successive bank contacts, drive shafts and gears therefor, and means responsive to the actuation of said motor for normally driving said first gear and shaft, said two other gears and intermediate shaft and one of said plurality of wiper shafts to advance the wipers thereon over the associated bank contacts.

5. A selecting device comprising in combination, two sets of wipers mounted on separate shafts, an intermediate shaft normally in geared relation with one of said wiper set mounting shafts, a drive shaft geared to said intermediate shaft, means for rotating said drive shaft to cause said one wiper set mounting shaft to advance its wipers over associated bank contacts, and means for sliding said intermediate shaft endwise to disengage the gearing of said intermediate shaft from said one wiper set mounting shaft and to engage said intermediate shaft gearing with the other of said wiper set mounting shaft to cause the wiper set thereon to be advanced over its associated bank contacts.

6. A device as claimed in claim 5 in which a latching device is provided to prevent rotation of both said wiper set mounting shafts while said drive shaft rotating means is non-effective.

HENRY JOHN EDWARDS.